Sept. 22, 1931. F. A. DAY Re. 18,199

HEEL BREASTING MACHINE

Original Filed Oct. 14, 1929 2 Sheets-Sheet 1

INVENTOR.
Fred A. Day
By his attorney
Victor Cobb.

Sept. 22, 1931. F. A. DAY Re. 18,199

HEEL BREASTING MACHINE

Original Filed Oct. 14, 1929 2 Sheets-Sheet 2

INVENTOR.
Fred A. Day
By his attorney
Victor Cobb.

Reissued Sept. 22, 1931

Re. 18,199

UNITED STATES PATENT OFFICE

FRED AUSTIN DAY, OF CINCINNATI, OHIO, ASSIGNOR, BY MESNE ASSIGNMENTS, TO UNITED SHOE MACHINERY CORPORATION, OF PATERSON, NEW JERSEY, A CORPORATION OF NEW JERSEY

HEEL BREASTING MACHINE

Original No. 1,758,030, dated May 13, 1930, Serial No. 399,426, filed October 14, 1929. Application for reissue filed August 3, 1931. Serial No. 554,791.

This invention relates to an improved machine adapted for use in the manufacture of wooden heels of the type employed in connection with feminine footwear and the illustrated machine is particularly applicable to the function of breast surfacing a heel blank of the so-called Cuban type.

Cuban heels, under modern practice, are characterized usually by breast surfaces or grooves which are so formed that when the heel blank is viewed from the side the vertical edges of the blank formed by the juncture of the sides and breast surfaces present a substantially straight line or straight edge appearance. Heels of this type, following the modeling of the wooden blank or body, are covered with leather, cloth, celluloid or other suitable materials to present a desired esthetic or ornamental appearance. Usually, these outer coverings are adhesively secured to the wooden heel body or in certain instances by the employment of tacks or other suitable fasteners. Considerable difficulty has been encountered in permanently securing the meeting edges of such coverings to the heel body. It frequently happens that the covering material becomes loosened from the body and presents an undesirable appearance or renders the heel unsuitable for further use.

In accordance with the present invention, a machine is provided which produces a vertical groove or slot in the breast surface of a heel blank, which extends from the heel seat to the lower or tread surface of the heel blank and is disposed in substantially the center of the breast surface. By the provision of this groove or slot the covering material, which is applied around the heel blank, may have the adjoining edges or ends thereof forced or tucked into said groove for the purpose of positively retaining the covering material in a taut or stretched condition around the heel blank but without liability of undue separation of the covering from the heel blank.

It is a primary object of the present invention to provide a machine which will in one operation form the breast surface of a heel blank and also operate to form the vertically extending cover receiving slot in said breast surface, these operations being quickly effected with a very considerable saving in manufacturing costs as compared with previous methods and machines employed for this purpose.

For a further understanding of the invention reference is to be had to the following description and the accompanying drawings, wherein.

Figure 1:
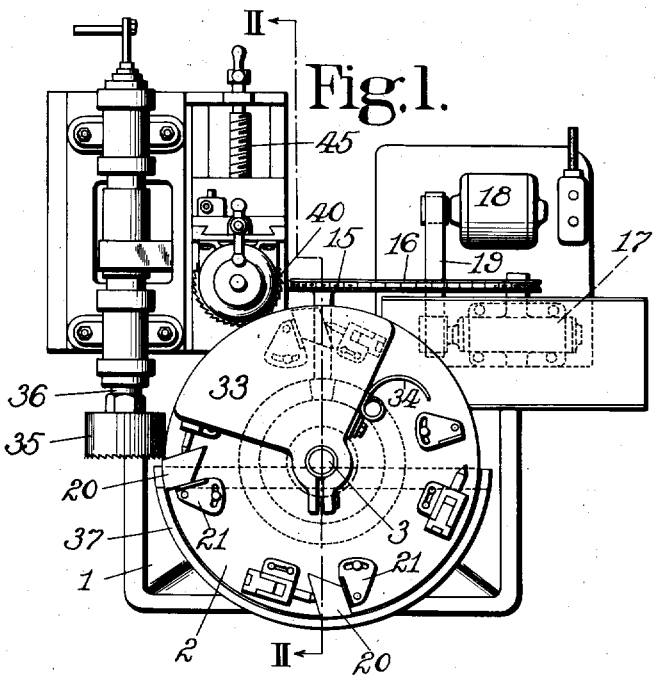
Fig. 1 is a top plan view of the improved heel breasting machine comprising the present invention.
Figure 6:
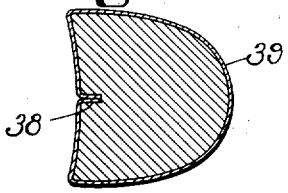
Fig. 6 is a horizontal sectional view taken through a completed heel having a covering thereon.
Figure 2:
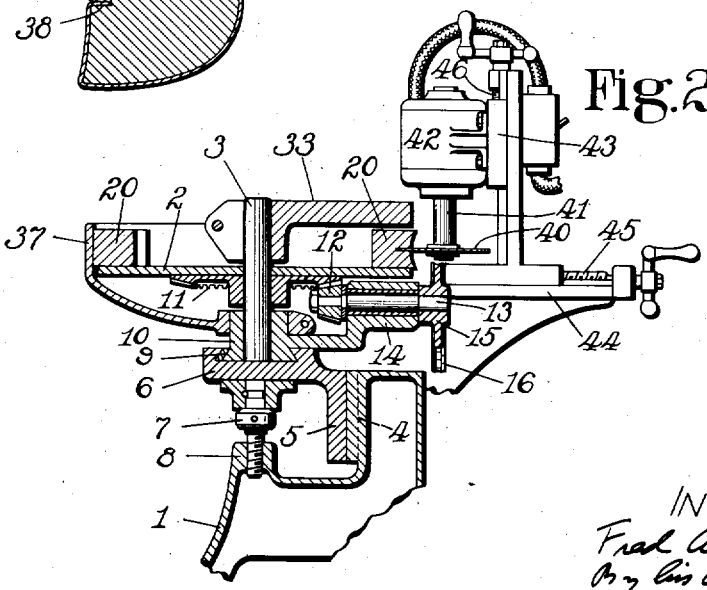
Fig. 2 is a vertical sectional view taken through the machine on the plane indicated by the line 2—2 of Fig. 1.

Referring more particularly to the drawings, the numeral 1 designates the metallic base of the machine and upon the upper end of this base there is mounted a circular, horizontally disposed work support or table 2, which is adapted to rotate about a center axis provided by an upstanding stud or shaft 3.

To effect the support of the table, the upper end of the base 1 is provided with a vertically grooved surface 4 which receives the vertically ribbed surface 5 of a vertically adjustable bracket 6, the adjustment of said bracket being regulated by means of a screw 7 which is received within a threaded gland 8 provided in the top of the base 1. The bracket 6 is provided with a horizontal groove 9 in its upper surface which receives a longitudinally adjustable bearing member 10, said bearing member being provided with a central bore adapted for the reception of the lower end of the shaft 3, around which the table 2 rotates. The under side of the table 2 is provided with a beveled gear 11 arranged to mesh with a pinion 12, fixed upon a short transversely extending shaft 13, which is mounted in a bearing 14 formed in the member 10. The outer end of the shaft 13 is equipped with a sprocket 15, around which passes an endless chain 16. This chain is also passed over a drive sprocket carried by a speed reduction unit 17 which is mounted on the base 1. Power is imparted to the reduction unit by means of a motor 18, which is equipped with a drive belt 19. It will be seen that the operation of the motor 18 will effect the rotation of the table 2 at a desired rate of speed. Moreover, through the provision of the adjustable bracket 6 and the bearing 10 the table may be moved to secure a desired operating position with respect to cutting devices to be hereinafter more fully described.

Figure 3:
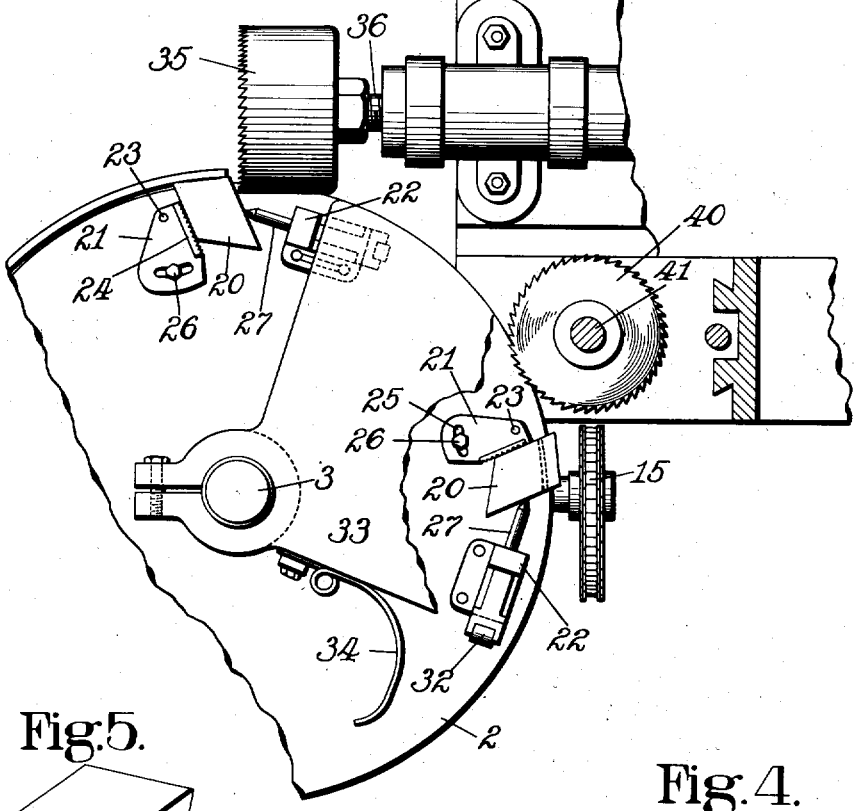
Fig. 3 is a top plan view of the machine on a somewhat enlarged scale, as compared to Fig. 1, and discloses more particularly the breasting and grooving cutters employed in connection with the machine.
Figure 5:
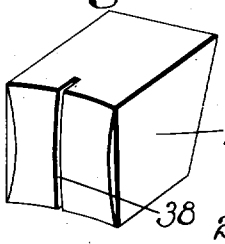
Fig. 5 is a perspective view of a heel blank after being operated on by the cutter of the machine.
Figure 4:
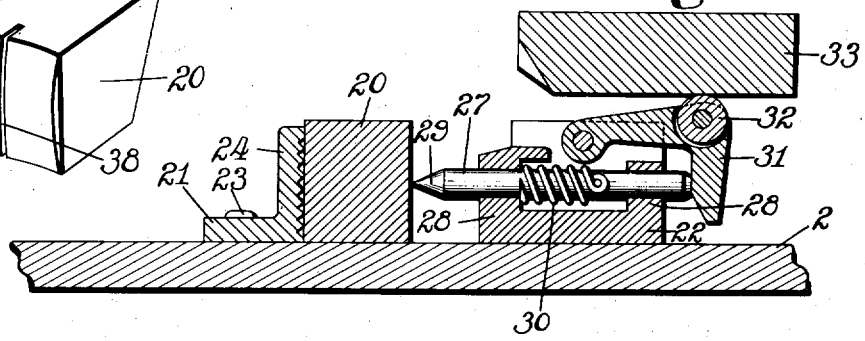
Fig. 4 is a vertical sectional view disclosing more particularly the clamping devices employed for retaining a heel blank in an applied position on the work support of the machine when such heel blank is engaged with said cutters.

Arranged upon the upper surfaces of the table 2 are sets of heel clamping devices which are used to retain heel blanks 20 in secure connection with the table. Each set of these devices consists of an anchor plate 21 and a clamping block 22. Each plate 21 rests flatly upon the upper surface of the table and is pivotally connected thereto as at 23, the plate being provided with an upturned vertically arranged rest 24 against which the tread surface of a heel blank is placed, as shown in Fig. 3, the rest 24 is preferably corrugated or serrated on one side thereof to more securely grip the heel blank. The horizontal portion of each plate 21 is provided with an arcuate slot 25, and a cooperating clamping screw 26 is carried by the table 2 and arranged within the slot 25. This construction permits the clamping plate to be adjusted so as to hold a heel blank at a desired operating angle in connection with the peripheral portion of the table 2.

The clamping block 22 is firmly secured to the upper surface of the table and is spaced from the complemental anchor plate 21. Each of these blocks is provided with a bolt or pin 27 which is slidably received within bearings 28 provided in the block 22. The front or heel engaging end of the bolt or pin is sharpened as at 29 so that the pin will more securely engage the block to hold the latter in an applied position. A coil spring 30 surrounds each pin and tends to move the latter longitudinally backward. Carried by each block is an angular lever or arm 31, the outer portion of which engages the rear end of the pin 27. The intermediate portion of each of the levers or arms 31 is provided with a roller 32, which is so disposed as to engage with the under surface of a cam plate 33 which is carried by the upper end of the shaft 3 and is arranged in a horizontal plane above the table 2. The plate 33 is of segmental form and is so disposed that when the heel blocks or blanks 20 are engaged with the machine cutters the rollers 32 of the levers 31 will be in engagement with the under surface of the plate 33. This forces the levers 31 downwardly, against the resistance of the springs 30, with the result that the bolts or pins 27 are projected forwardly into biting or frictional holding engagement with the heel blanks, holding the latter stationary while the same are being acted upon by the various cutters of the machine. After the heel blanks have been moved past the cutters, the levers or arms are removed from engagement with the cam plate, with the result that the spring 30 may force the bolts 27 rearwardly and away from the heel blanks. The heel blanks then contact with a resilient ejecting spring 34 carried by the plate 33, and this spring serves to wipe or remove the finished blocks from the table by a purely automatic operation. The blanks usually fall into a bin or hopper, after dropping from the table, so that they can be conveniently collected. The only manual function involved is to place the blocks upon the table 2 between the clamping devices before the latter engage with the cam plate.

The breasting of the heel blanks is accomplished by means of a cutter 35, illustrated as a barrel saw. This cutter is carried by the outer end of a horizontally journaled shaft 36, driven from any suitable source of power. The cutter is arranged immediately contiguous to the peripheral portion of the table 2, as shown in Figs. 1 and 3, and also immediately adjacent to the terminating portion of an arcuate guide 37 carried by the bearing member 10. It will be understood that the operator places the heel blanks between the clamping devices with the breast surface of the heel blank in engagement with the inner surface of the guide 37. As the table revolves the clamping devices are rendered effective by the employment of the cam plate 33 so that when the heel blank is presented to the cutter 35 it is rigidly held so that the cutter may operate effectively thereon. It should be observed that the table 2 rotates in a horizontal plane about the axis of the shaft 3 and, also, the cutter 35 revolves about the axis of the shaft 36. Due to this arrangement, the breast surface, or, as it is ordinarily called, the "groove" produced upon the heel blank is transversely concave and vertically convex, that is to say, when the heel blank is removed from a machine and arranged in a normal position, horizontal sections through said heel blank will disclose that the breast surface is concave, whereas vertical sections taken through the heel blank will disclose that said heel surface is slightly convex. The concavity is produced by the cylindrical cutter, whereas the convexity is produced by the rotation of the work support while the heel blank is being moved past the cutter. This compound curvature, in connection with the finally curved sides of the heel blank produces a straight line appearance at the juncture of the breast surface of the heel blank with the side surfaces. This straight edge effect is desired particularly in the Cuban type of heels. I am aware of the fact that heels of this kind have been produced heretofore and that machines have been designed to accomplish the effect, and therefore do not claim such a machine broadly as my present invention, but merely in combination with certain other features to be now described.

As previously stated, it is desirable in the manufacture of wooden heel blanks to provide means for permitting the secure association of ornamental coverings to the wooden body of the heel blank to produce a permanent and durable heel construction. One method of securing this result is to provide a longitudinally extending groove or slot 38 in the breast surface of the heel blank which extends from the heel seat surface of the blank to the tread surface thereof and which is arranged centrally of the heel surface. The cover 39 which is placed around the heel blank or body has its adjoining ends forced into the slot 38 and thereby frictionally, as well as adhesively, secured therein. Heretofore it has been customary to separately finish the breasting operation and the slotting operation. In the present machine both of these operations are cooperatively combined, which produces a marked economy in the manufacture of heels of this type.

To produce the slot 38 in the heel blank, there is provided a horizontally arranged circular saw or cutter 40, which is mounted for rotation in a horizontal plane immediately adjacent to the peripheral portion of the table 2 and the cam plate 33. The horizontal plane of the saw is such as to cause the teeth of the saw to engage with the central portion of the breast surface of a heel blank supported by the table 2 while such heel blank is clamped by the action of the cam plate 33.

The saw or cutter is supported for rotation by the vertically extending shaft 41 of a motor 42. This motor is carried by a bracket 43 adjustably mounted upon a horizontal ledge 44 formed with the base 1. A horizontal screw 45 is utilized for the purpose of adjusting the saw toward and away from the peripheral portion of the table 2, thereby controlling the depth of the groove produced in the heel blank. Similarly, a vertical screw 46 is utilized for the purpose of adjusting the motor 42 vertically on its supporting bracket 43. By this adjustment the horizontal plane of operation of the saw may be located so that the same may be properly centered with respect to the heel blank. It will be understood that the heel blanks are of different sizes and it is therefore necessary to provide these adjustments in order to adapt the machine to heel blanks of all kinds.

In view of the foregoing, it will be seen that the present invention provides a heel breasting machine by means of which both the breasting or grooving and the slotting operations are carried out in each cycle of operation of the machine. This avoids the necessity of utilizing two machines and, furthermore, provides for economy as well as increased production in heel manufacture.

Having described my invention, what I claim as new and desire to secure by Letters Patent of the United States is:

1. In a heel breasting machine, a base, a table rotatably mounted in connection with said base, means for rotating said table, a cylindrical cutter carried by said base and mounted for rotation about an axis disposed perpendicularly to the axis of the table, a clamping device on said table adjacent to the peripheral edge thereof for supporting a heel blank in connection with said base adjacent to the peripheral portion of the table and arranged to engage with the heel blank as the latter rotates with the table past said cutter, a horizontally disposed slotting cutter carried by said base and adapted to engage with said heel blank, and means operating upon said clamping device to hold the latter in clamping engagement with said heel blanks while the latter are in engagement with both of said cutters.

2. In a heel breasting machine, a revolving work supporting table, a work holder arranged on said table and adapted to retain a heel blank adjacent to the outer edge of the table, a cylindrical cutter mounted for rotation independently of said table for rotation about an axis disposed perpendicularly to the axis of the table, a slotting cutter mounted independently of said table and disposed adjacent to the periphery of the latter for rotation about an axis disposed parallel to the axis of the table, and means cooperative with said work holder for retaining the latter in clamping engagement with said heel blank while the latter is presented to said cutters successively.

3. A machine of the character described, comprising a work supporting table mounted for rotation about a vertical axis, a cylindrical cutter situated adjacent to the peripheral edge of said table and mounted for rotation independently of said table, said cutter revolving about an axis disposed substantially perpendicularly to the axis of the table, a second cutter arranged for rotation in a horizontal plane adjacent to the peripheral edge of said table, and work holders arranged on said table adjacent to the outer edge thereof and adapted to retain heel blanks in fixed positions so as to engage said cutters during the rotation of the table.

4. A machine of the character described, comprising a table mounted for rotation in a horizontal plane, a frame supporting said table, means for rotating said table, a cylindrical cutter mounted on said frame independently of said table and located adjacent to the periphery of the table, said cutter being provided with cutting teeth arranged for rotation in a plane perpendicular to the plane of rotation of the table, a second cutter mounted upon said frame independently of said table and disposed adjacent to the periphery of the table, said second cutter being mounted for rotation in a plane parallel with that of the table, means for rotating said cutters, and heel blank clamping devices carried by said table and arranged to present heel blanks to the cutting teeth of said cutters during the rotation of the table.

5. A machine of the character described, comprising a frame, a work support mounted on said frame for rotation in a horizontal plane, heel blank clamps for securing heel blanks in an operative position upon said support adjacent to the peripheral edge thereof, a cylindrical cutter having the cutting teeth arranged for rotation in a vertical plane and in the path of movement of the heel blanks carried by said support, a circular saw arranged in a horizontal plane carried by said frame adjacent to said support to engage with the heel blanks carried thereby, and means admitting of relative adjustment between said table and cutters in both vertical and horizontal directions.

6. A machine of the character described, comprising a frame, a work supporting table rotatably mounted on a vertical axis in connection with said frame, means for adjusting the operating positions of said table horizontally and vertically with respect to said frame, drive mechanism for rotating said table, a cylindrical cutter rotatably mounted on said frame independently of said table and disposed adjacent to the peripheral edge of said table, a flat horizontal saw rotatably mounted on said frame independently of said table and contiguous to the peripheral edge of the latter, blank clamping devices carried by said table for receiving heel blanks to be presented to said cutters, and automatically operating means for causing said devices to exert a gripping action on said heel blanks during engagement of the latter with both of said cutters.

7. In a machine of the class described, a rotatable table, an axial support therefor, work holding means on the upper surface of said table including an anchor section, a gripping section spaced from said anchor section, said gripping section being provided with a sliding plunger between the outer ends of which and said anchor section the heel blank to be clamped is placed, spring means acting on said plunger to normally space the latter from said heel blank, a pivoted arm carried in connection with said table and disposed normally in engagement with one end of said plunger, a stationary member carried by the axial support of said table above and in the path of movement of said arm to swing the latter about its pivotal mounting whereby the plunger is forced into engagement with the heel blank, a vertically disposed cylindrical cutter arranged to engage with said heel blank while the latter is clamped between the anchor and gripping sections of the table, and a horizontally disposed cutter arranged to engage with said heel blank while the latter is clamped in connection with the table.

8. In a heel breasting machine, a heel blank carrier, a breast grooving tool and a breast slotting tool, and means for driving said carrier for presenting a heel blank in the carrier to the tools in succession to form a groove and a slot in predetermined relation in the breast of said heel blank.

9. A machine of the character described having a frame, a rotary cutter arranged to form a desired breast surface on a heel blank, a work carrying member arranged to hold a heel blank with its breast surface toward the cutter, a slotting cutter located adjacent to the work carrying member and arranged to form a slot running heightwise in the breast surface of a heel blank in the work carrying member, means for effecting relative movement, heightwise of the heel blank, between the work carrier and the said cutters, and means for relatively adjusting the cutters and work carrier to locate the breast groove properly in the heel blank, and to position the slot properly in the breast groove.

10. A machine of the character described having a frame, a rotary cutter arranged to form a desired breast surface on a heel blank, a work carrying member arranged to hold a heel plank with its breast surface toward the cutter, a slotting cutter located adjacent to the work carrying member and arranged to form a slot running heightwise in the breast surface of a heel blank in the work carrying member, means for effecting relative movement, heightwise of the heel blank, between the work carrier and the said cutters, means for relatively adjusting the cutters and work carrier to locate the breast groove properly in the heel blank and to position the slot properly in the breast groove formed in the heel blank, and means cooperating with the work carrying member to keep the work carrying member in engagement with a heel blank while the heel blank is presented successively to the said cutters.

11. In a heel breasting machine, a base, a table rotatably mounted on said base, means for rotating said table, a cutter carried by said base and mounted for rotation about an axis, a clamping device on said table adjacent to the peripheral edge thereof for supporting a heel blank adjacent to the peripheral portion of the table and arranged to engage the heel blank as the latter rotates with the table past said cutter, a slotting cutter carried by said base and adapted to engage said heel blank, and means operating upon said clamping device to hold the latter in clamping engagement with said heel blanks while the latter are in engagement with both of said cutters.

12. In a heel breasting machine, a revolving work supporting table, a work holder arranged on said table and adapted to retain a heel blank adjacent to the outer edge of the table, a breast forming cutter mounted for rotation adjacent to the outer edge of the table, a slotting cutter mounted adjacent to the periphery of the table for rotation about an axis parallel to the axis of the table, and means for retaining the work holder in engagement with a blank while the latter is presented successively to said cutters.

13. A machine of the character described, comprising a frame, a work supporting table rotatably mounted in said frame, drive mechanism for rotating said table, a cutter rotatably mounted on said frame and disposed adjacent to the peripheral edge of said table, a saw rotatably mounted on said frame contiguous to the peripheral edge of the table, means for adjusting the position of the table relatively to the cutter and saw, blank clamping devices carried by said table for receiving heel blanks to be presented to said cutters, and automatically operating means for causing said devices to exert a gripping action on said heel blanks during engagement of the latter with both of said cutters.

In testimony whereof I have signed my name to this specification.

FRED AUSTIN DAY.